United States Patent Office 3,494,424
Patented Feb. 10, 1970

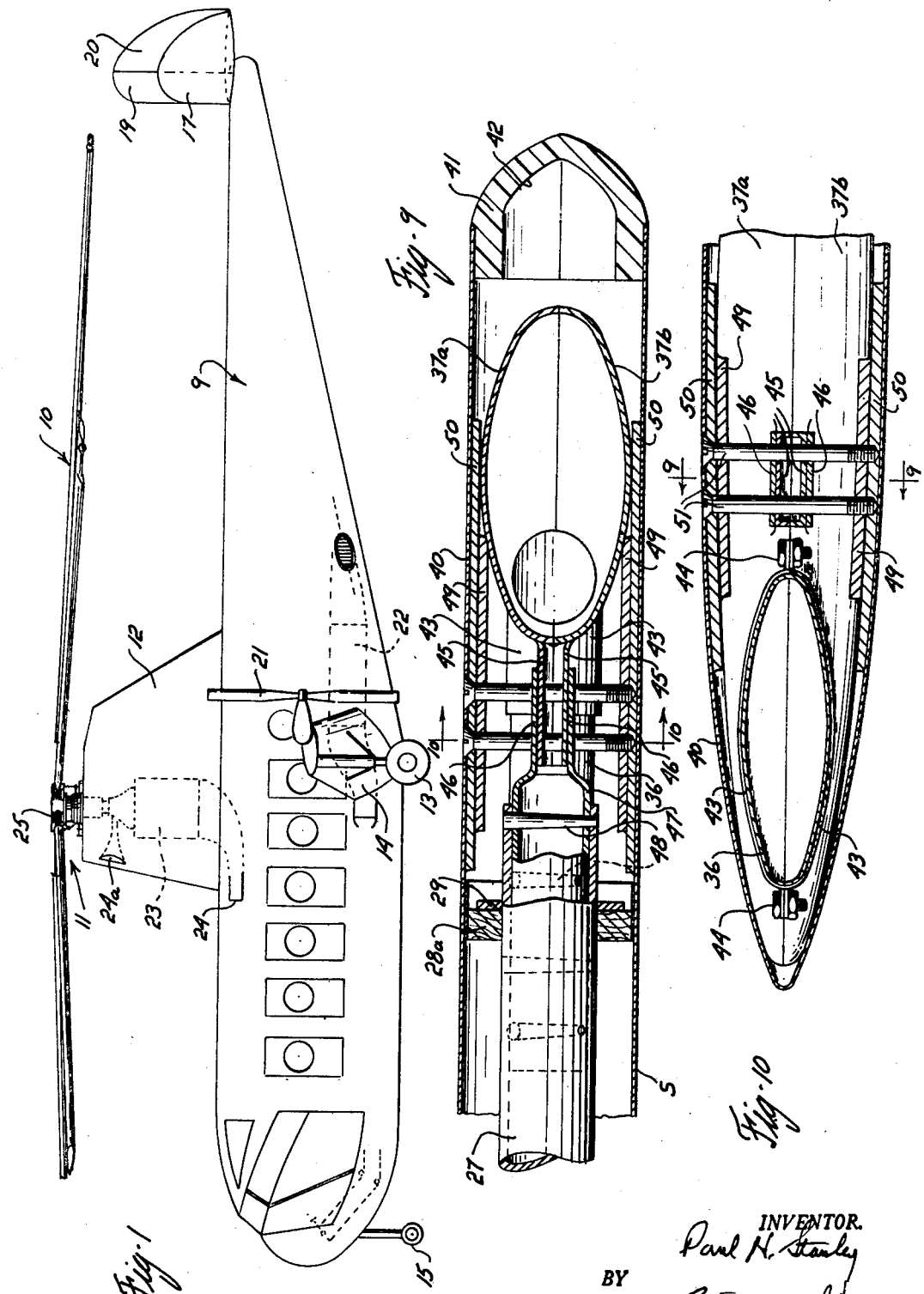

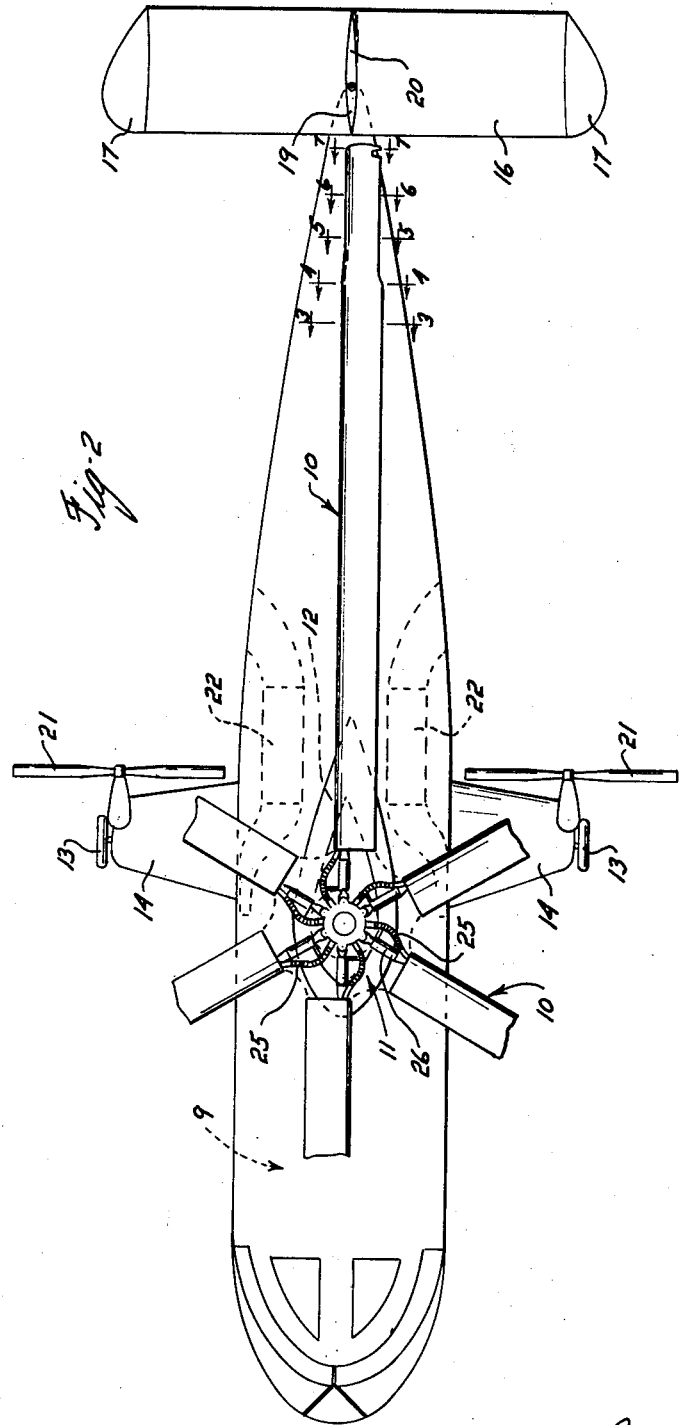

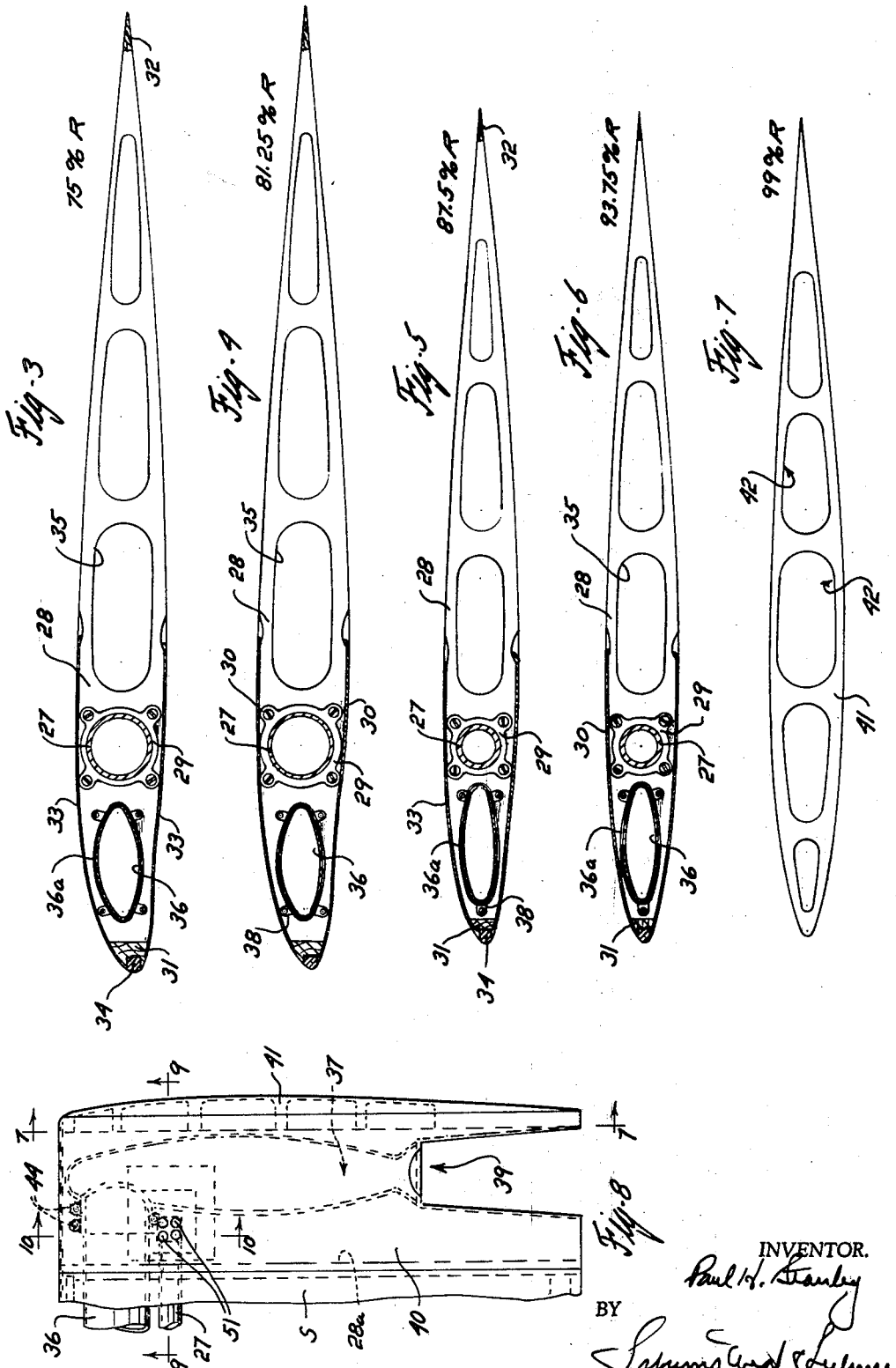

3,494,424
AIRCRAFT SUSTAINING ROTOR SYSTEM AND ROTOR BLADE THEREFOR
Paul H. Stanley, Glenside, Pa., assignor to Autogiro Company of America, Jenkintown, Pa., a corporation of Delaware
Continuation-in-part of applications Ser. No. 503,536, Oct. 23, 1965, and Ser. No. 650,475, June 30, 1967. This application Dec. 11, 1967, Ser. No. 703,203
Int. Cl. B64c 27/46, 27/18
U.S. Cl. 416—223     9 Claims

ABSTRACT OF THE DISCLOSURE

Sustaining rotor system for rotary wing aircraft especially such aircraft having propulsion means in addition to the rotor and in which the rotor also incorporates drive mechanism operating at least for take-off, and rotor blade for such a rotor system having inboard cambered portion and progressively diminishing camber in outboard portion, having structure providing forward location of sectional center of gravity, and preferably also having blade driving jets and a duct for delivery of energized operating fluid to the blade jets.

---

This application is a continuation-in-part of my co-pending applications Ser. No. 503,536 filed Oct. 23, 1965 and No. 650,475 filed June 30, 1967, both now abandoned. A continuation-in-part application of application Ser. No. 503,536 was filed on Sept. 12, 1968, under Ser. No. 759,829.

This invention relates to rotary wing aircraft and is particularly concerned with various form of high performance rotary wing aircraft, i.e., rotary wing aircraft capable of relatively high translational flight speeds as well as of vertical or substantially vertical flight, for instance for take-off and landing.

Rotary wing aircraft of the general types to which the invention relates may or may not have the rotor driven during translational flight, and when driven, the drive may be either mechanical drive effected through the rotor hub or may be torqueless or jet drive achieved by the use of jet devices carried by the rotor, for instance at the tips of the rotor blades. Although not limited in this respect, the invention is also especially useful in connection with rotary wing aircraft of the kinds just mentioned in which (whether or not the rotor is power driven in translational flight), a propulsion means is employed contributing propulsive effect, regardless of whether some propulsion is also being derived from the sustaining rotor. Thus, in certain aircraft with which the invention is useful, the rotor is power driven, for instance through the rotor hub, as in the manner of a more or less conventional helicopter, and propulsive effect is secured both by forward inclination of the lift line of the sustaining rotor, and also by provision of propulsion means on the body of the aircraft, for example one or more propulsive air screws.

On the other hand, the aircraft with which the invention is particularly useful may also be of a configuration in which the sustaining rotor, although powered at least for take-off, and if desired also for landing, is autorotatively actuated during translational flight, and in which propulsion means is also provided, for instance one or more propulsive air screws. Still further, the invention has special utility in connection with aircraft of the type last mentioned above and in which torqueless (for instance jet) rotor drive means are also provided for assisting or supplementing the autorotative rotation of the rotor during translational flight.

In all of the types of high performance rotary wing aircraft above referred to the rotor blades are subjected to a wide variation of air speeds under varying operating conditions, so that under at least some operating conditions, the blade tip speed will be so high that the air flow over the surface of the blade at the tip approaches Mach 1. Unless provision is made to the contrary, attaining an air flow speed of Mach 1 may result in compression effects having a tendency to sharply increase the drag and thus impair the efficiency of operation of the blade.

One of the principal objectives of the present invention is the provision of a rotor system, including specially constructed and shaped rotor blades capable of achieving a special combination of operating characteristics. Thus, the invention contemplates a blade form and construction providing relatively high lift characteristics in inboard regions of the blade, while at the same time employing a blade form at the blade tip minimizing the tendency to encounter sharp increase in the blade drag under certain of the operating conditions in which the tip speed approaches the speed of sound and also minimizes drag effects when operating close to or above the speed of sound.

One typical form of rotary wing aircraft of the kind in which the invention is particularly useful is disclosed in my copending application Ser. No. 503,536 filed Oct. 23, 1965, of which the present application is a continuation-in-part.

As disclosed in said prior application, a rotary wing aircraft is provided having a sustaining rotor system and also having propulsion means in the form of a pair of outboard engine driven air screws, the aircraft further including jet drive mechanism for the sustaining rotor comprising jet devices mounted at the blade tips and further comprising a gas turbine engine (additional to the engines for driving the air screws) delivering operating gases or fluid through the rotor blades to the blade tip jets.

In operation of an aircraft of the kind just referred to, the gas turbine engine and the jet drive mechanism for the rotor are capable of use not only for effecting vertical or accelerated take-off and for cushioning vertical landing, but also for drive of the rotor during translational flight, thereby making possible increased translational flight speeds, as compared with certain other forms of rotary wing aircraft.

The invention is also useful in connection with various other forms of rotary wing aircraft above mentioned, for instance an aircraft of the general configuration of that disclosed in the copending application above referred to, but in which the jet drive mechanism for the rotor is not adapted for sustained or continued use during translational flight, but is usable for short intervals of time either for assisting vertical or accelerated take-off or for cushioning vertical landing.

Various of the types of aircraft referred to above (including configurations in which the rotor drive means is employed only for limited times such as in take-off and landing, or configurations in which the rotor drive means is in constant use under all flight conditions) are well adapted to certain types of transport service frequently referred to as short haul transport, especially for passenger transport between cities separated by distances running up to several hundred miles.

In the operation of various of the types of aircraft just mentioned the capability of effecting vertical or accelerated take-off and cushioned landing enables the aircraft to operate into and out of small areas close to population centers, even to and from rooftop airports or decks, and this is an important capability with reference to the type of transport service above referred to.

One of the principal objectives of the present invention is the provision of a rotor blade of such aeroform shape and construction as to attain a combination of characteristics, especially aerodynamic characteristics, uniquely suited to a sustaining rotor for aircraft of the types described above, having in mind especially the broad range of rotor operating conditions necessitated as a result of operation of the rotor either in vertical take-off and landing, or in translational flight. The range of operating conditions, including speed of air flow over the blade tips, is particularly broad in a machine which is not only capable of substantially vertical take-off and landing but in which propulsion means is employed in addition to the rotor and in which the rotor is driven during translational flight, so that the air speed over the tips of the advancing blades in translational flight attains a very high value.

More specifically, it is an objective of the present invention to combine in a single rotor blade regions of different aeroform section or contour, the major portion of the blade radius from the hub having an airfoil section of relatively high lift characteristic, and the outer or tip portion of the blade progressively varying in sectional shape from the section of the inboard portion to or approximately to a substantially symmetrical blade section, such as is well adapted to the conditions encountered in relatively high blade tip speed operation, as induced by the rotor blade jet drive mechanism. In this way a blade is provided which combines low drag characteristics in the tip region where the air speed is high, particularly during jet driven phases of operation, while at the same time providing high lift characteristics throughout most of the blade length and especially in the region of the average location of the radial center of pressure of the blade, i.e., in the neighborhood of 75% of the radius of the blade from the hub.

While providing the desirable combination of aerodynamic characteristics above referred to, the invention further has as an objective the combining of these desirable aerodynamic characteristics with certain structural arrangements which provide not only for the delivery of jet operating fluid to a jet device at the blade tip, but which further provide a desirable chordwise or sectional location of the center of gravity of the blade, in relation to the chordwise location of the center of pressure of the blade in the effective lift producing region of the blade.

More specifically, it is contemplated according to the invention to utilize an inboard relatively high lift blade section which is of cambered form but which has a relatively stable sectional center of pressure which will not experience substantial chordwise excursion with variations in aerodynamic angle of attack. It is also contemplated to use a symmetrical section at the blade tip and to maintain the inboard cambered section up to a radius point of approximately 75% of the blade span, and then progressively alter the blade section, in a manner to be described herebelow, from the cambered section to the symmetrical section at the tip.

Structurally, it is contemplated according to the invention to locate the duct for feeding the energized jet operating fluid to the blade tip jet in the forward or nose portion of the blade, not far from the span line or longitudinal axis defining the maximum blade thickness, so that a duct of substantial cross sectional area, adequate to carry the energized operating fluid from the hub to the blade tip jet, will not require the use of a duct of excessively large chordwise dimension as compared with its dimension in the direction of the thickness of the blade. This facilitates accommodation within the blade of a fluid duct of relatively large cross sectional area which, in turn, is of importance in the use of a jet system in which the energized fluid is produced inboard of the blade itself, for instance at some point within the body of the aircraft, the rotor mount or the rotor hub. This has certain advantages, as compared with a jet system in which the fuel is burned directly in a jet device at the tip of the blade. For example, the production of the energized fluid for jet operation within the body of the aircraft and the distribution of that fluid from its source in the body to the blade tip jets, assures greater uniformity of blade tip jet operation, as compared with a system in which fuel is burned individually in a tip jet of each blade, it being difficult to maintain uniformity of operating conditions in a plurality of blade tip jets. Moreover, in an aircraft of one of the types herein contemplated, in which the blade tip jets are used only intermittently, for instance only for take-off and landing, if the fuel is burned in the blade tip jets it is necessary to effect simultaneous ignition of the fuel in all of the jets, this representing a timing problem which is not present where the jets are supplied with energized fluid from a common source of production located in the body of the aircraft.

A further advantage of the arrangement described is a very extensive reduction in the noise level during operation of the aircraft, as compared with a rotor having blade tip jets in which the fuel is burned in the tip jets. The burning of fuel in blade tip jets is an exceptionally noisy operation.

While achieving the foregoing aerodynamic characteristics of the rotor blade and the rotor, the invention also has in view certain structural arrangements in the blade which will provide a chordwise or sectional location of the center of gravity of the blade (especially in the effective lift producing portions thereof), which is at least as far forward as the sectional center of pressure of the rotor blade, and preferably slightly ahead of the sectional center of pressure. This is achieved in part by location of the duct for the energized fluid for rotor blade jet operation in advance of the blade spar, and further by the provision of certain elements of the blade in the nose portion thereof which will further tend to shift the chordwise center of gravity forwardly in the blade. By these provisions, the blade not only has the desirable aerodynamic characteristics above referred to but further has either a neutral or a negative pitching moment characteristic (due to the location of the chordwise center of gravity either at or ahead of the chordwise center of pressure) and such pitching moment characteristic introduces a stability in blade operation according to which increase in lift on the individual blades is in part compensated for by decrease in effective aerodynamic angle of attack due to torsional deformation of the blade.

The invention still further provides a novel and improved arrangement for mounting a plenum chamber and jet device at the tip of a rotor blade, provision being made for carrying the centrifugal load of the tip jet itself and also of certain associated parts directly on the primary longitudinal structural element or spar of the blade.

How the foregoing and other objects and advantages are obtained will appear more fully from the following description referring to the accompanying drawings, in which:

FIGURE 1 is a side elevational view of an aircraft of a type to which various features of the invention are especially applicable, portions of the rotor blades extending forwardly of the aircraft in this figure being broken off;

FIGURE 2 is a top plan view of the aircraft of FIGURE 1, showing the rearwardly extending rotor blade in full, but with the remaining rotor blades broken off a short distance from the hub;

FIGURES 3 to 7 inclusive are sectional views of a rotor blade constructed according to the present invention, the several sections of these views being taken at different points radially of the blade, substantially as indicated by the section lines 3—3 to 7—7 inclusive as applied to FIGURE 2;

FIGURE 8 is an enlarged fragmentary plan view of the tip of the rotor blade, showing the jet device mounted therein; and FIGURES 9 and 10 are enlarged fragmentary sectional views taken as indicated by the section lines 9—9 and 10—10 on FIGURE 8.

The aircraft illustrated in FIGURES 1 and 2 comprises a body or fuselage 9 in the forward portion of which the cabin and pilots' stations are located, the aircraft here shown being of relatively large size, for instance capable of accommodating up to about 40 passengers in addition to the crew.

The principal means for sustention of the aircraft comprises an overhead rotor system composed of blades generally indicated at 10, six blades being included in the embodiment of the rotor shown in FIGURES 1 and 2. The rotor blades are connected with a central rotor head structure 11 mounted above the body of the aircraft by means of structural members (not shown) which may be enclosed within the streamlined housing 12.

Main landing wheels 13 are arranged at the outer ends of lateral outriggers 14, and a nose wheel 15 is also provided.

The aircraft is equipped with an empennage incorporating a horizontal surface 16 having upturned tips 17 and a vertical fin 19 behind which a controllable rudder 20 is provided.

Propulsion of the aircraft is derived from a pair of propulsive air screws 21—21 arranged at the outer ends of the outriggers 14 and driven by means of gas turbine engines diagrammatically indicated at 22—22. It will be noted that the gas turbine engines 22—22 are disposed within the body of the aircraft, and, as disclosed in my copending application above referred to, it is preferred to employ a drive transmission system between the engine and the air screws including drive interconnecting parts extended from one air screw to the other, with gearing arranged to deliver the torque from either or both of the engines to the drive parts which interconnect the air screws. In this way, in the event of failure of one engine, the other engine will effect drive of both air screws.

From reference to FIGURE 1 it will also be seen that a gas turbine engine diagrammatically indicated at 23 is mounted within the fairing 12 below the rotor hub, this engine serving to develop energized fluid, i.e., exhaust gases, for feed up through the hub and radially outwardly through the rotor blades to blade tip jet devices for effecting torqueless power drive of the blades. Air inlets, one of which appears at 24 in FIGURE 1 for the gas turbine 23 are provided and have inlet openings arranged, one at each side of the fuselage, just below the fairing 12. Additional air inlets 24a are arranged to introduce air into the effluent gases delivered from the turbine 23, in order to effect some cooling of those gases prior to transmission through the hub and thence through the blade ducts to the blade tip jets. The details of the arrangement of the gas turbine 23 need not be considered herein as they form no part of the present invention per se. It may be mentioned, however, that as disclosed in my copending application above referred to, the gas turbine 23 is mounted on a vertical axis and the exhaust gases are delivered upwardly through a hollow central rotor hub structure to which the rotor blades are attached. The energized or exhaust gases are then distributed from the hollow hub through flexible ducts such as shown at 25 to the root end of the individual blades, for transmission within the blades to the blade tip jets in the manner more fully described herebelow in connection with the description of the blade structure preferably employed according to the present invention.

It should also be noted that the individual blades are desirably connected with the rotative hub structure by means of pivots or articulations, including a pitch pivot shown in outline at 26 in FIGURE 2, and also flapping and drag pivots (not shown) disposed between the pitch pivots and the hub itself in well known manner, for instance as disclosed in my copending application above referred to.

The rotor system is desirably provided with rotor controls, including for example cyclic blade pitch control providing for maneuvering of the aircraft and for control of the longitudinal and lateral attitude of the aircraft. These controls may include swash mechanism of known type, together with collective or mean blade pitch control, as shown for example in my copending application above identified.

Turning now to the form and structure of the sustaining rotor blades, attention is first directed to FIGURE 2 which illustrates the plan shape of one of the rotor blades, i.e., the blade in that figure which extends rearwardly from the hub structure over the rear portion of the body of the aircraft to a point adjacent to the empennage. Here it will be seen that the plan pattern of the blade is one in which the blade is made up of two portions, each of uniform chord dimension, with a wider chord throughout the inboard portion of the blade extending outwardly about ⅘ of the blade radius from the axis of rotation. The outboard ⅕ or tip region of the blade is of narrower but uniform chord dimension.

The cross sectional form and also the construction of the blade appears to better advantage in FIGURES 3 to 10 inclusive. The several sectional views of FIGURES 3 to 7 inclusive are taken at radius points indicated by the section lines in FIGURE 2, and in addition the specific radius (in percentage of radius from the axis of rotation) is given in a legend associated with each of FIGURES 3 to 7.

With regard to the construction of the blade, it is first pointed out that a blade having the improved aerodynamic and dynamic characteristics above referred to may be constructed of a variety of materials, such as metal, glass fiber reinforced resin material, wood, or combinations of these materials. In the illustrative embodiment disclosed in the drawings, the blade is of the type built up upon a spar and ribs, the spar comprising a metal tube 27 which constitutes the principal longitudinal structural element of the blade and is connected with the pitch bearing at the inboard end of the blade. As will be seen from comparison of FIGURES 3 and 4 on the one hand and with FIGURES 5 and 6 on the other hand, the spar tube 27 experiences a step taper and this occurs at about the point where the chord dimension is reduced.

In the illustrative embodiment disclosed, the transverse ribs 28 are mounted upon the spar tube 27 and these ribs may be formed either of plywood or of metal, each being provided with a metal fastening collar 29 which may be riveted to the rib as indicated at 30 and which may also be welded to the outside surface of the spar tube.

Along the leading edges of the ribs a wood strip, for instance a spruce strip, is provided as indicated at 31, and a similar trailing edge stringer 32 may be employed along the trailing edge of the blade, serving to interconnect the trailing ends of the ribs.

The nose portion of the blade is preferably enclosed by a sheet material, for instance plywood or metal, such as indicated at 33, this material being employed on both the upper and lower sides of the ribs. A doped fabric covering or a thin metal skin S (not shown in FIGURES 3 to 7) may then be applied over the entire blade structure, in order to enclose the structural elements and define the aeroform contour of the blade throughout the length of the blade including regions intermediate the ribs.

Along the leading edge of the nose strip 31 a metal balance element, such as the brass strip indicated at 34 is provided, for purposes more fully explained herebelow, and this metal strip is of course also enclosed within the overall covering or skin S for the blade.

Each of the ribs 28 is also provided with a number of cut-outs such as indicated at 35, rearwardly of the spar 27.

Although in the illustrative embodiment of the blade described above, various parts of the blade are made of wood, it is understood that an all metal construction could be employed in fabrication of a blade having the aerodynamic characteristics contemplated according to this invention.

A duct 36 is arranged within the blade extending parallel to the length of the blade in the region between the spar 27 and the nose strip 31. This duct is of substantial cross sectional area, occupying a large part of the volume of the nose portion of the blade and therefore is adequate to carry energized fluid from the hub radially outwardly to the jet drive device which is indicated at 37 in FIGURE 8. The duct 36 is desirably positioned within apertures in the ribs, as by means of collars having brackets 38.

The centrifugal load on the duct itself is desirably carried at the inner end of the duct, and at the points where the duct passes through the positioning collars it is contemplated that the duct will have freedom to slip within the collars to accommodate thermal expansion and contraction. Thus, the manner of connection of the plenum chamber with the spar and the duct in effect provides an interconnection or joint means providing freedom for relative thermal expansion and contraction of the spar and the duct. When using wood ribs, the duct is preferably surrounded with a heat insulating strip 36a where it passes through the positioning collars.

The arrangement, construction and mounting of the jet device 37 at the blade tip is shown in FIGURES 8, 9 and 10. From these figures it will be seen that the jet comprises a plenum chamber having a jet nozzle at 39, the plenum chamber receiving energized fluid from the duct 36 in the region of the leading edge of the blade, and the nozzle 39 serving to deliver the energized fluid rearwardly of the blade, thereby effecting torqueless rotor drive, as is contemplated.

The jet device 37 is enclosed within a metal covering or blade tip indicated at 40, and within the outer end of this metal covering a tip rib or closure member is provided, as indicated at 41 (see FIGURES 7, 8 and 9). This tip member provides the blade contour or form at the blade tip and is suitably formed of molded plastic or light metal material having recesses or hollow portions indicated at 42.

In the embodiment of the jet device as shown in FIGURES 8, 9 and 10, the plenum chamber and jet are formed of upper and lower halves 37a and 37b with meeting edges welded together, the cross sectional shape of the plenum chamber being substantially elliptical, as clearly appears in FIGURE 9. Toward the leading end of the plenum chamber, each half is cut out and a half section of a piece of elliptical tube 43 is welded to each piece 37a and 37b of the plenum chamber. These two half sections of elliptical tubing surround and embrace the outer end of the duct 36 and are fastened to each other at three points with bolts indicated at 44, preferably in a manner providing, in effect, a slip joint accommodating thermal expansion and contraction of the duct.

The centrifugal load on the plenum chamber and jet is carried principally by means of a connection with the outer end of the blade spar 27. For this purpose, each part 37a and 37b is provided with a tang or plate 45 projecting therefrom and lying between the upper and lower parts 46 of a fork provided at the end of the tubular stub spar element 47 which is dimensioned to fit into the interior of the outer end of the spar tube 27 and which is secured to the spar tube, for instance by pins 48.

The tangs 45 and fork parts 46 lie between the pairs of plates 49 and 50 which are provided on the inside surface of each of the upper and lower parts of the covering skin 40 of the blade tip, and all of these parts (40, 50, 49, 46, 45, 45, 46, 49, 50 and 40) are secured together by means of the machine screws 51, which are countersunk in one of the plates 50 and which are threaded in the plates 49 and 50 at the outer surface of the blade.

This connection, especially when combined with the joint between the leading edge of the plenum chamber and the outboard end of the duct 36 provides an effective interconnection of all of the parts at the blade tip by means of which centrifugal loads are carried largely and directly to and through the spar itself. Preferably the tip skins 40 are fastened to the outboard rib of the blade, which appears at 28a in FIGURE 8, and this fastening, together with the interconnection of the skins, plenum chamber and the spar also serve to transmit the centrifugal load of the skins to the spar.

Attention is now called to the fact that at the 75% radius point, as shown in FIGURE 3, the blade has a cambered airfoil shape. An appropriate blade section for this region of the blade being one of the NACA 230 series of blade sections. The blade here also has a thickness ratio of about 9%. Other similarly shaped airfoil sections may be here employed, it being contemplated according to the invention that the airfoil section be cambered and be of relatively high lifting section, as compared with a symmetrical section blade. This blade contour is desirably maintained uniformly throughout the inboard portion of the blade, at least in the inner ⅔ to ¾ of the radius of the blade from the center of rotation. Outboard of the inboard portion of the blade just mentioned, i.e., in about the outer ⅓ to ¼ of the blade, the airfoil section progressively varies from the section utilized in the inboard portion to a section at the extreme tip of the blade which is symmetrical, for instance of the NACA 64–009 series. This progressive variation in the blade contour is indicated from serial comparison of FIGURES 3 to 7 inclusive. Thus, in FIGURE 4 the trailing edge portion of the blade (rearwardly of about the spar) is symmetrical in section and the leading edge portion has slightly less camber than does the leading edge portion of the blade section in FIGURE 3. Again, in FIGURE 5, the trailing edge portion is symmetrical and the leading edge portion has slightly less camber than the leading edge portion in FIGURE 4. A similar comparison can be made between FIGURES 6 and 7, and, finally, at the extreme tip of the blade, as represented in FIGURE 7, all camber has been eliminated, and the blade section is symmetrical all the way from nose to trailing edge, in accordance with a typical NACA 00 series airfoil section. It will be understood that progressive changes in sectional contour of the blade throughout the region represented by FIGURES 3–7 is gradual, rather than in steps, the zones between those shown in FIGURES 3–7 being gradually rather than abruptly altered from one contour to the next.

It will be observed that this variation of the blade shape from the cambered section of FIGURE 3 to the symmetrical section of FIGURE 7 is carried even through the zone of the step taper in plan shape above referred to, which, in the blade here given by way of example, occurs at about 83% of the blade radius from the center of rotation.

In connection with the use of the cambered section, for instance the NACA 230 section, it is to be noted that other sections of similar aerodynamic characteristics may be employed. The 230 section has, and any other similar section selected should have, a substantially stable center of pressure characteristic, and preferably also both the cambered section and the symmetrical section employed in the blade should have a chordwise center of pressure location not appreciably ahead of about the 24 or 25% chord position from the leading edge of the blade.

Blades constructed according to the present invention are adapted to be mounted upon a supporting hub structure and to operate at positive lift incidence. Although sections of the blade at different spanwise points may have somewhat different pitch settings, the blade advantageously has substantially the same pitch setting throughout its span, i.e., the chord line of the blade at all spanwise points is positioned at the same angle with reference to a plane perpendicular to the axis of rotation. For instance from a slightly positive angle of about 0.5° up to about 10° measured with reference to a plane perpendicular to the axis of rotation may be used.

With a pitch or chord line setting such as that just referred to the average lift incidence of the blade will vary in accordance with the decrease in mean camber of the blade. With the minimum pitch setting referred to, in the inboard portion of the blade there will be about 2° positive effective lift incidence, measured in relation to the no lift position for that section of the rotor blade. This positive lift incidence will decrease as the tip is approached, and at the blade tip, where the invention contemplates use of a symmetrical section, the positive effective lift incidence will be the same as the minimum pitch setting, namely 0.5°. Similarly the lift incidence of the inboard portion of the blade at the maximum pitch setting will be approximately 11.5° and at the tip of the blade the lift incidence will again be the same as the maximum pitch setting, namely 10°.

With a blade constructed and shaped as above described, the invention further contemplates use of a brass or other relatively heavy metal ballast element 34 along the leading edge of the blade, in order to keep the chordwise center of gravity of the blade well forwardly, and thus ensure its location at a position at or forward of the center of pressure line. This is of importance in providing a neutral or negative pitching moment characteristic and it is preferred to have negative pitching moment in order to establish a stable blade operating condition. Where the pitching moment characteristic of the blade is negative, as is preferred, when under load the blade twists somewhat from its pitch setting at the root, so that the tip of the blade assumes a reduced incidence value, as compared with inboard portions of the blade. Therefore, in mounting the blades at the root, such pitching moment characteristic should be kept in mind in order to be sure that all portions of the blade operate in flight at positive lift incidence, as is preferred.

It will be understood that in a typical rotary wing aircraft, the collective pitch control system, providing for variation of the blade pitch on the pitch bearings such as shown at 26, makes possible adjusting the average pitch and thus the average incidence setting throughout a range appropriate to various conditions of flight operation, including autorotational operation and vertical take-off. Moreover it is contemplated according to the invention that even with a setting of the collective pitch control providing for minimum flight operating pitch, the effective lift incidence angle of the blades shall still be positive.

It will also be understood that cyclic pitch control of the rotor blades may be utilized for maneuvering the aircraft in flight, and that such cyclic pitch variation may occur about the pitch bearings 26 and may be superimposed on whatever collective pitch setting is utilized.

With further reference to the structure of the blade as disclosed herein, it is to be noted that the spar is preferably so located chordwise of the blade that the elastic or spar center axis is located not more than 25% of the chord from the leading edge of the blade, and preferably at about the 25% chord position. This is of advantage not only in order to keep the chordwise or sectional center of gravity of the blade well forwardly in the blade, but also to keep the spar axis close to the chordwise center of pressure of the blade, which lies in the neighborhood of the 25% chord point, this latter relationship providing for direct transmission of the aerodynamic and centrifugal loads into and through the spar to the hub, with minimum tendency to introduce torsional moments.

In considering the operation and advantages of the airfoil contours of the blade herein illustrated and described, it is first pointed out that a symmetrical section airfoil, such as the section at the tip of the blade is capable of operation at a higher air speed without encountering "drag divergence," i.e., sharp increase in blade drag, than is a cambered or relatively high lift blade section, such as the section illustrated in FIGURE 3. This is due to the fact that in the case of a symmetrical section blade, the increase in velocity of air flow over the surfaces of the blade, especially the upper surface as the air moves from the nose to the region of maximum thickness is not as great as in the case of a cambered or high lift blade section.

The sharp increase in drag, sometimes referred to as "drag divergence" occurs only when the velocity of air flow over the blade surface closely approaches or attains Mach 1. Therefore, in contrast with a blade of cambered section, with a blade of symmetrical section it is possible to employ a blade tip speed more closely approaching Mach 1 without encountering drag divergence.

The blade of the present invention, having a symmetrical section at the tip progressively varying to a blade of cambered section inboard to about the 75% radius point, makes possible high tip speeds without encountering abrupt increase in drag while, at the same time, making effective use of the increase in lift (and thus an increase in efficiency) incident to a cambered section, in the region somewhat inboard of the tip region. Indeed, it will be noted that the high lift section is utilized throughout the inner ¾ of the blade radius and in the region of the 75% radius point, which represents the average location of the spanwise center of pressure of the blade. The arrangement of the invention thus maximizes the increase in efficiency obtainable by the employment of cambered airfoil section.

The plan form of the blade, with a tip portion, for instance about the outer 15% of the blade radius of smaller chord than the inboard portion of the blade, also contributes to the important objective contemplated herein, namely making possible the employment of a blade tip speed as high as possible without encountering drag divergence, or at least minimizing drag due to compressibility effects. The reason for this is that, with the smaller chord dimension, the blade sections used also have smaller thickness ratio, and with the resulting smaller thickness, the increase in the velocity of the air over the blade surfaces is not as great as with a blade of greater thickness.

Because of the higher blade tip speed operation made possible in accordance with the present invention, it is practical to operate the rotary wing aircraft at a higher translational flight speed for various reasons including the fact that the higher tip speed minimizes the flapping range of motion of the blades incident to compensation for differential lift effects on the advancing and retreating sides of the rotor.

I claim:

1. A sustaining rotor wing or blade for rotary wing aircraft, said blade having an airfoil section progressively varying from the region of the blade tip inwardly at least to a point about one quarter of the blade radius from the tip, the progressive variation being from an outboard blade portion having symmetrical section to an inboard blade portion within the outer one quarter of the blade radius having an unsymmetrically cambered section, the blade sections of both the outboard blade and inboard blade portions having a substantially stable chordwise center of pressure, and the blade being set to have a positive lift incidence measured with relation to the zero lift position throughout the portion of the blade of unsymmetrically cambered section and also the portion of the blade of symmetrical section.

2. A sustaining rotor wing or blade for rotary wing aircraft, said blade having an airfoil section in about the outer one quarter of the blade radius at least most of which is unsymmetrically cambered and of progressively increasing camber from the tip region of the blade inwardly, the tip region being of symmetrical section and there being a gradual transition from the symmetrical section of the tip region inwardly to the portion of cambered section.

3. A wing or blade according to claim 2 in which the airfoil section is of substantially uniform unsymmetrical camber throughout about the inner ¾ of the blade radius.

4. A sustaining rotor wing or blade for rotary wing aircraft, said blade having an unsymmetrically cambered airfoil section substantially from the root end to the tip region and having a symmetrical airfoil section in the tip region, the asymmetry of the unsymmetrically cambered portion of the blade progressively diminishing from a substantial value in an intermediate region of the blade to zero adjacent the tip region, the blade also having a positive lift incidence measured with relation to the zero lift position throughout its length, and about the outermost one-fifth of the blade being of reduced chord dimension as compared with the inboard four-fifths of the blade.

5. A wing or blade according to claim 4 in which the reduction in chord dimension occurs in a step at a point outboard of the 75% radius point.

6. A sustaining rotor wing or blade for rotary wing aircraft, said blade having a rotor driving jet device with its discharge outlet concentrated in the region adjacent the blade tip, the blade having an unsymmetrically cambered airfoil section substantially from the root end to the tip region and having a symmetrical airfoil section in the tip region including the region adjacent the discharge outlet of the jet device, the asymmetry of the unsymmetrically cambered portion of the blade progressively diminishing from a substantial value in an intermediate region of the blade to zero adjacent the tip region, the blade also having a positive lift incidence measured with relation to the zero lift position throughout its length, and an energized fluid carrying duct disposed in the leading edge of the blade and extending substantially throughout the length of the blade to deliver said energized fluid to the jet device for discharge therefrom and thereby impart torqueless driving force to the rotor blade.

7. A rotor blade according to claim 6 in which the portion of the blade inboard of about the 75% radius point is cambered substantially according to the NACA 230 series airfoil sections.

8. A rotor blade according to claim 2 having a chord dimension smaller outboard of the three quarter blade radius point as compared with the chord dimension inboard of the three quarter blade radius point.

9. A sustaining rotor wing or blade for rotary wing aircraft, said blade having an unsymmetrically cambered airfoil section substantially from the root end to the tip region and having a symmetrical airfoil section in the tip region, the asymmetry of the unsymmetrically cambered portion of the blade progressively diminishing from a substantial value in an intermediate region of the blade to zero adjacent the tip region, the blade also having a positive lift incidence measured with relation to the zero lift position throughout its length, and the plan pattern of said blade comprising an inboard and an outboard portion, each portion being of substantially uniform chord dimension, but with the outboard portion of smaller chord dimension than the inboard portion.

References Cited

UNITED STATES PATENTS

| 2,021,470 | 11/1935 | Upson | 170—160.11 X |
|---|---|---|---|
| 2,408,788 | 10/1946 | Ludington et al. | 170—135.4 X |
| 2,601,463 | 6/1952 | Stanley | 170—135.4 |
| 2,656,892 | 10/1953 | Campbell | 170—135.4 |
| 2,717,043 | 9/1955 | Isacco | 170—135.4 |
| 2,776,016 | 1/1957 | Campbell | 170—135.4 |
| 2,869,649 | 1/1959 | Lux | 170—160.11 |
| 3,096,826 | 7/1963 | Amer et al. | 170—135.4 |
| 3,120,274 | 2/1964 | Irbitis | 170—135.4 |
| 3,321,021 | 5/1967 | Girard | 170—166 X |
| 2,454,040 | 11/1958 | Dalton | 170—135.4 |
| 2,988,152 | 6/1961 | Katzenberger et al. | 170—135.4 |
| 3,173,490 | 3/1965 | Stuart | 170—159 |

FOREIGN PATENTS

| 687,481 | 4/1930 | France. |
|---|---|---|
| 732,051 | 2/1943 | Germany. |
| 883,819 | 12/1961 | Great Britain. |

EVERETTE A. POWELL, JR., Primary Examiner

U.S. Cl. X.R.

170—135.4